April 11, 1950          L. O. BU MILLER          2,503,997
ADJUSTABLE TRIPOD LEG
Filed May 17, 1947
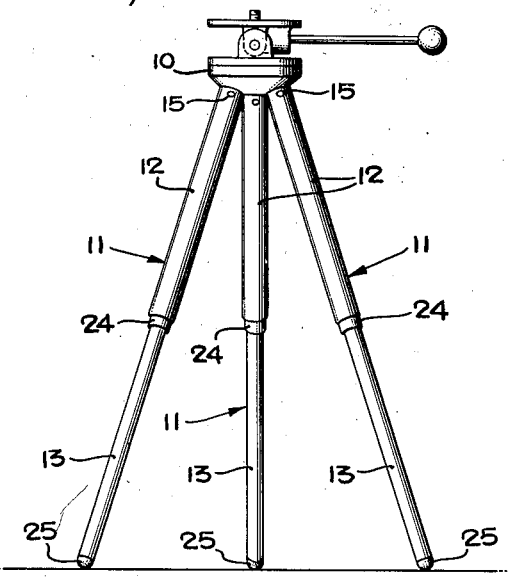
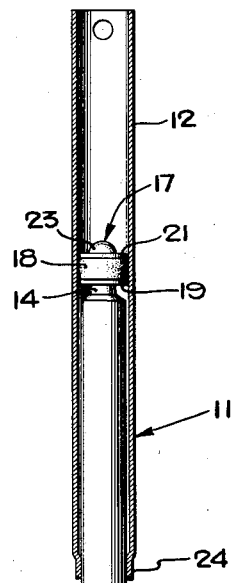
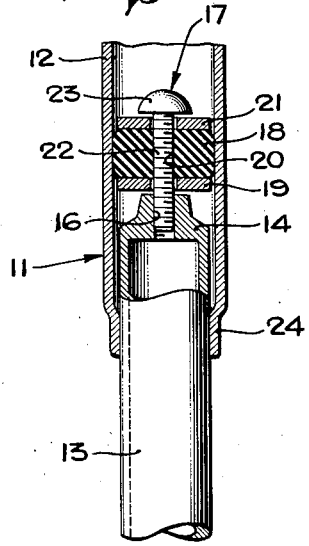
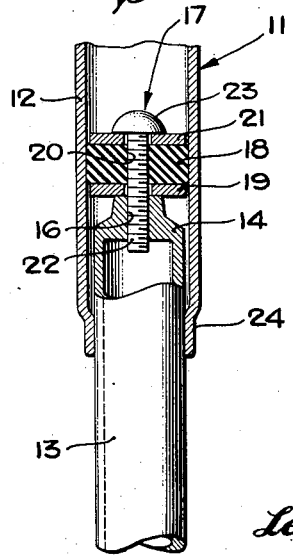
Leo Otto Bu Miller
INVENTOR.
BY
ATTORNEY Patented Apr. 11, 1950

2,503,997

UNITED STATES PATENT OFFICE 2,503,997

ADJUSTABLE TRIPOD LEG

Leo O. Bu Miller, Van Nuys, Calif., assignor to Edward H. Hopkins, Los Angeles, Calif.

Application May 17, 1947, Serial No. 748,756

1 Claim. (Cl. 287—58)

This invention relates to an anchoring device for adjustably positioning two telescoping members with respect to each other, and more particularly, but not necessarily, to adjustable tripod legs.

Much difficulty is experienced in leveling tripods used for supporting cameras, surveying instruments and the like, due to the irregularities of the supporting surface on which it is frequently required to position these devices. Usually, the legs are pivotally mounted at their top to the body of the tripod in order that they may be positioned at various angles to the perpendicular, and arranged for longitudinal extension by arrangements of slidable members which may be clamped together by means of thumb screws or other clamping means. The clamping means, such as thumb screws usually employed for clamping the telescopic type of leg, is objectionable due to the thumb screw projecting outwardly and contacting elements which often loosen the screws and cause the leg or legs to become loose. In addition the clamping members are bulky and often mar and damage the leg elements. It is, therefore, a primary object of this invention to provide a novel means for anchoring two telescopic members with respect to each other, wherein the anchoring means is located entirely within the outer telescopic member.

Another object is to provide an anchoring means for two telescopic members that may be actuated by relative rotation of one member with respect to the other.

A further object is to provide an anchoring device for adjustably positioning two telescopic members that will be simple in structure, durable, efficient in operation and comparatively cheap to manufacture.

A further object is to provide anchoring means for two telescopic members that will positively engage the two members at spaced points and thereby render the connection between the two members rigid and positively fixed in relation to each other.

The above and other objects will be made apparent from further description of the invention when taken in connection with the accompanying drawings wherein like reference characters refer to like parts. It is to be distinctly understood that the drawings are not a definition of the invention but merely illustrate an exemplary form by means of which the invention may be effectuated.

Fig. 1 is a side elevation view of a tripod embodying the invention.

Fig. 2 is a vertical sectional view of one of the tripod legs embodying the invention.

Fig. 3 is an enlarged fragmentary sectional view of the anchoring means in normal released position.

Fig. 4 is a view similar to Fig. 3, showing the device in locked or anchored position.

Referring to the drawings the numeral 10 indicates the head of a tripod having three legs, each leg represented in its entirety by 11. The legs 11 may be connected at their tops by any suitable means such as shown at 15.

Each of the legs 11 consists of an outer and upper tubular member 12, an inner, lower member 13 which may be tubular or solid, as desired. In any event, the inner member is provided with a head portion 14 through which an axially disposed threaded bore 16 is provided for receiving and supporting an anchoring means represented in its entirety by 17.

The anchoring means 17 consists of a compressible resilient annulus 18 which may be made of rubber. The annulus 18 is provided with a central bore in axial alignment with the threaded bore 16 in the head 14 of the inner member 13. Lower and upper pressure plates, 19 and 21 respectively, rest against the lower and upper surfaces of the annulus 18, each of these pressure plates, 19 and 21, being provided with axial openings in alignment with the openings 20 in the annulus 18 and the threaded opening 16 in the head 14 of the inner member 13. A threaded member 22, having a head portion 23, extends through the opening in the pressure plate 21, annulus 18, pressure plate 19, and is threaded into the threaded opening 16 whereby upon turning the inner member clockwise the threaded opening 16 cooperating with the threaded member 22 will operate to draw the head 23 downwardly and into contact with the upper face of the pressure plate 21, while simultaneously the upper end of the inner member 13 will contact the lower face of the pressure plate 19, and as the member 13 is rotated the threaded member 22 will cause the pressure plates 19 and 21 to compress the annulus 18 into pressure contact with the inner walls of the outer member 12, thereby anchoring the members 13 and 12 into fixed relation.

The external diameter of the cylinder or annulus 18 is substantially equal to the internal diameter of member 12, so that when such element 18 is uncompressed some force is required to frictionally axially slide the member 13 and annulus 18 into a desired position within the member 12. In order to further resist free rotation of 18 within member 12, the outer surface of 18 may be provided with grooves extending in a direction parallel to the axis of opening 20. Moreover, the axial opening 20 in the cylinder or annulus 18 should be sufficiently small so as to group and frictionally hold the threaded member 22 against free rotation with respect to 18.

The ratio of diameter to height of the resilient, elastic annulus may vary; when height exceeds diameter a greater force is needed to slidably adjust the members, but upon expansion of the annulus a larger gripping surface is engaged.

The inner member 13 may be slightly smaller in external diameter than the inner diameter of the outer member 12 and the lower end of the member 12 being reduced as shown at 24 to slidably receive the inner member 13. In this construction, as illustrated by the drawings, the members 12 and 13 are in close contact at the bottom of the outer member 12 and the point of contact with the annulus 18, thereby supporting the members 12 and 13 at spaced points, which makes for a rigid substantial connection.

When it is desired to adjust the members 12 and 13 relative to each other, it is only necessary to rotate the inner member 13 counterclockwise with respect to member 12 for releasing the pressure plates 19 and 21 from the annulus 18 and slide the members 12 and 13 longitudinally with respect to each other to provide the length of the leg or other member as may be required. After adjusting the member 12 and 13, the member 13 is then rotated clockwise with respect to member 12 and clamping the pressure plates to expand the annulus into holding contact with the outer member.

The inner member may be tubular and provided at its lower end with rubber or other suitable feet 25 inserted therein or the inner member may be solid and suitable feet attached to its lower end by any suitable means such as an axial recess.

The present device is simple in structure, efficient in operation, and the anchoring means is entirely concealed within the outer telescopical members. Also, the device may be readily and easily operated by merely rotating the inner member with respect to the outer member and adjusted at the will of the operator without the assistance of tools or projections, and, further, the device is comparatively cheap to manufacture as well as attractive in appearance.

The adjustable anchoring construction, although shown embodied in a tripod, may be used in less of various forms of furniture (such as card tables etc.), in towel rack arms, camp tent poles, and wherever longitudinal extension and retraction is desired. While I have illustrated and described a single form of the present invention, it will be apparent to those skilled in the art that certain changes, substitutions, additions and modifications may be made in the exemplary form shown without departing from the spirit and scope of the appended claim.

I claim:

An anchoring device for adjustably positioning two telescoping members with respect to each other including an inner cylindrical telescoping member provided with a smooth outer surface of uniform diameter, an outer telescoping member including a bore adapted to slidably receive the said inner member, an internally threaded axial bore in one end of the inner member, a headed element provided with a threaded shank in engagement with the internally threaded bore, a cylindrical annulus of resilient rubber composition frictionally mounted upon the shank of the headed member, the outer diameter of the annulus being virtually equal to the inside diameter of the bore in the outer member and frictionally slidable therein and pressure applying rings adjacent each end of the annulus, whereby rotation of the inner member is translated into axial movement of the headed element to apply opposing pressures to the pressure rings to expand the annulus into holding engagement with the bore in said outer member.

LEO O. BU MILLER.

REFERENCES CITED

The following references are of record in the file of this patent:

UNITED STATES PATENTS

| Number | Name | Date |
| --- | --- | --- |
| 663,804 | Buder | Dec. 11, 1900 |
| 2,291,748 | Neuwirth | Aug. 4, 1942 |
| 2,298,380 | Hood | Oct. 13, 1942 |

FOREIGN PATENTS

| Number | Country | Date |
| --- | --- | --- |
| 530,320 | Germany | Mar. 18, 1930 |